United States Patent [19]
Brock

[11] 3,760,662
[45] Sept. 25, 1973

[54] TOOL HOLDER ADAPTOR

[76] Inventor: Ivan R. Brock, 401 W. Main, Crothersville, Ind. 47229

[22] Filed: Aug. 20, 1971

[21] Appl. No.: 173,448

[52] U.S. Cl. ............................................. 82/35
[51] Int. Cl. ........................................ B23b 29/16
[58] Field of Search ............................... 82/35

[56] References Cited
UNITED STATES PATENTS

| | | | |
|---|---|---|---|
| 2,323,834 | 7/1943 | Moller | 82/35 |
| 811,027 | 1/1906 | Barlow | 82/35 |
| 1,240,221 | 9/1917 | Katzmarer | 82/35 |

Primary Examiner—Leonidas Vlachos
Attorney—Cohn, Powell & Hind

[57] ABSTRACT

This adaptor is used in conjunction with lathe attachment such as a knee type tool holder and includes a body having a stem which is received by the bushing aperture of the tool holder. The adaptor body includes axial and transverse openings. The axial opening is aligned with the lathe center to receive a bushing provided with a support aperture which receives the end of relatively slender stock for pointing. The transverse opening is oversize and is adapted to receive the tool in adjustable relation to the stock.

4 Claims, 6 Drawing Figures

PATENTED SEP 25 1973  3,760,662

INVENTOR
IVAN R. BROCK
BY
Cohn, Powell + Hind
ATTORNEYS

TOOL HOLDER ADAPTOR

BACKGROUND OF THE INVENTION

This invention relates in general to a tool holder assembly for use in end forming rod stock, and in particular to an adaptor which permits pointing and radiusing of relatively slender stock.

Conventional tool holders are available for forming points and radii at the end of rod stock. One of the more versatile lathe attachments, known in the trade as a knee tool holder may be used to perform this function within certain limits. Knee tool holders are useful for pointing rigid stock of relatively large diameter, capable of being held by the lathe chuck only, but are not suitable for end forming slender stock of a smaller size, for example ⅛ inch diameter. The reason for this is that conventional knee tool holders are not capable of supporting slender stock adequately during the cutting operation.

Special lathe attachment equipment is available to support slender stock which is of such a small diameter that it is liable to spring. However, such equipment is specially designed and therefore expensive. Moreover, the support means tends to scar the work with score marks and rub marks and cannot be utilized with a conventional knee type tool holder.

SUMMARY OF THE INVENTION

This adaptor is used in conjunction with a knee type tool holder and eliminates the need for additional special equipment by providing the knee type holder with a capability of pointing and radiusing relatively slender stock. The adaptor is easily attachable to conventional knee type holders without the need for special fasteners and may be used in conjunction with a wide variety of such holders. In general, these holders are of the type having a bored hole and mounting shank aligned with the lathe center, and are provided with a forwardly disposed offset arm for holding a cutting tool transversely of the lathe center. They may be connected to the tailstock of a common lathe or the turret of a turret lathe.

The adaptor includes a cylindrical body having an axis aligned with the lathe center and including an oversize transverse opening adapted to receive the tool. Support means, carried by the body, includes a support aperture which receives small bar stock in journal relation during machining. The adaptor also includes a stem received by the bored hole of the tool holder in non-rotatable relation.

The body includes a longitudinal opening, axially aligned with the lathe center and comprising a forward portion and rearward portion. The support means includes a centrally apertured bushing receivable within the forward portion of the opening and providing the support aperture. The bushing faces the rearward portion of the opening which provides a knockout passage facilitating removal of said bushing.

The oversize transverse opening extends through the body and is sufficiently large to receive the tool in offset relation from the lathe center.

Set screw means holds the bushing in place within the adaptor body and said screw means holds the adaptor stem within the axially bored hole of the tool holder.

The adaptor is relatively inexpensive to manufacture and provides a simple means of providing a conventional knee type tool holder with a capability of performing machining operations on relatively small diameter stock thereby obviating the need for special equipment heretofore necessary to accomplish this purpose.

DESCRIPTION OF THE PREFERRED EMBODIMENT

Figure 1:
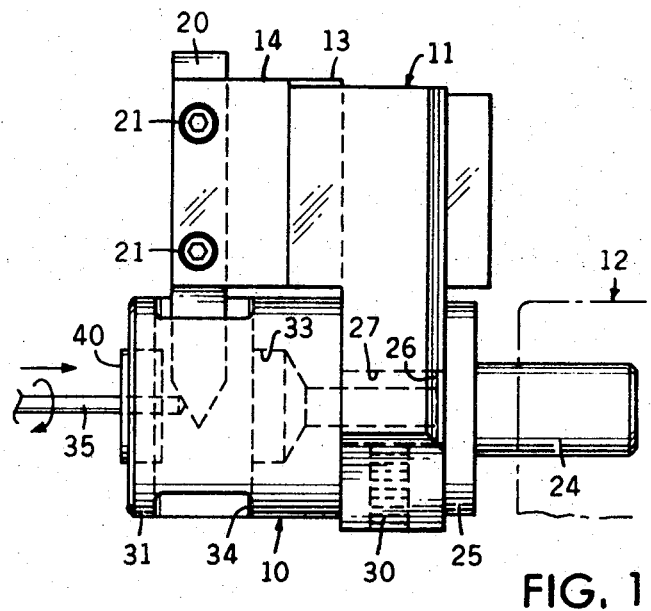
FIG. 1 is an elevational view of a knee tool holder assembly incorporating the adaptor.
Figure 5:
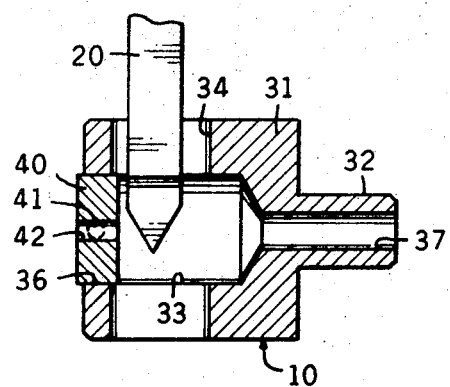
FIG. 5 is a sectional view taken on line 5—5 of FIG. 4.
Figure 3:
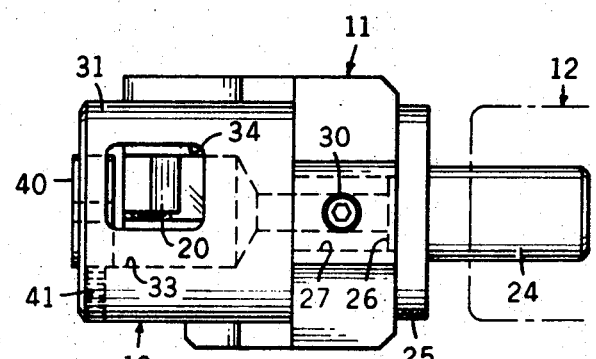
FIG. 3 is a view of the underside of the assembly.
Figure 6:
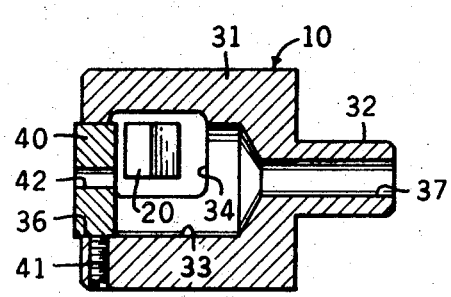
FIG. 6 is a sectional view taken on line 6—6 of FIG. 4.
Figure 4:
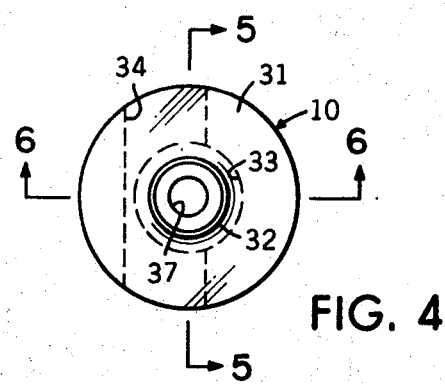
FIG. 4 is a rear end view of the adaptor.

Referring now by characters of reference to the drawing and first to FIG. 1 it will be understood that the adaptor 10 is used in conjunction with a knee type tool holder generally indicated by numeral 11. The tool holder 11 is held in fixed relation in a lathe tailstock 12, shown in broken outline. The adaptor 10 and the tool holder 11 are coaxial with the lathe center.

Figure 2:
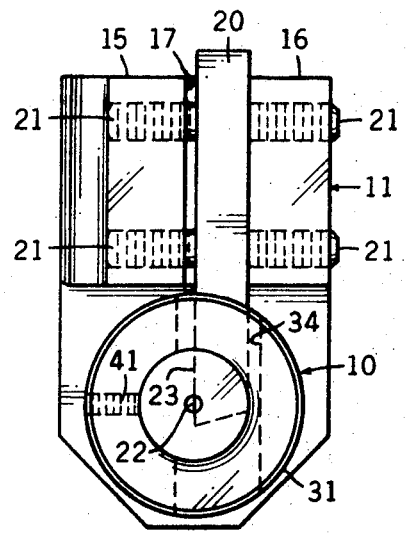
FIG. 2 is an end view of said assembly.

The tool holder 11 includes an L-shaped body 13 having a bifurcated forward portion 14 offset from the lathe center. The forward portion 14 is dovetail connected for transverse adjustment relative to the lathe center 22, shown in FIG. 2, and consists of a pair of spaced side plates 15 and 16 defining a gap 17, which is somewhat wider than an elongate cutting tool 20. The tool 20 is received and held within the gap 17 by means of a plurality of set screws 21. The set screws 21 provide the tool 20 with a lateral adjustment feature relative to the lathe center 22. As shown in FIG. 2 the side plates 15 and 16 are offset relative to the lathe center 22, which permits the forward edge 23 of the tool 20 to be aligned exactly with said lathe center 22. The adjustment feature provided by the set screws 21 permits this positioning to be selectively varied within the latitude afforded by the width of the gap 17.

The tool holder 11 is mounted to the tailstock 12 by means of a rearwardly disposed shank 24, which is directly received by the tailstock 12. The shank 24 includes a flange 25 having a reduced forward portion 26, which is located within a bored hole 27 provided in the tool holder body 13, and facilitates the attachment of the flanged shank 24 to the body 13.

In its conventional usage the bored hole 27 may be fitted with one of a plurality of drill bushings [not shown] which are suitable for forming longitudinal sockets in the end of a workpiece. Such bushings may accommodate a drill bit [not shown] suitable for performing a boring operation on a workpiece. A set screw 30 provides a means by which drill bushings and the like may be held in non-rotatable relation with the body 13. The bored hole 27 and the set screw 30 are utilized to provide a means by which the adaptor 10 is secured in non-rotatable relation to the tool holder body 13 as will be described.

The adaptor 10 includes a substantially cylindrical body 31 provided with a stem 32 having an axial opening 33 extending throughout its length. A transverse opening 34 communicates with the axial opening 33. The stem 32 is slidably received within the bored hole 27 and the adaptor 10 is firmly secured to the tool holder 11 in non-rotatable relation by means of the set screw 30. As is clearly shown from FIG. 1 the adaptor 10 is utilized to support relatively small diameter stock such as that indicated by numeral 35 for the pointing or radiusing of the end thereof. The adaptor may also be used for relatively slender stock which is liable to spring. In order to facilitate the machining of selective sizes of stock, the forward portion 36 of the axial opening 33 is of a size to accommodate apertured bushings such as that indicated by numeral 40. The bushing 40 is a push fit within the opening 33 and is held in place by means of a set screw 41. The reduced rearward portion 37 of the opening 33 provides a means by which a knock-out device [not shown] may be inserted within the adaptor 10 to effectuate the removal of the bushing 40 when the set screw 41 has been loosened. It will be understood that the bushing 40 includes a central aperture 42 which, in effect, provides a journal for a selected size of stock on which the milling operation is to be performed. To this end, the aperture is substantially equal in diameter to the size of such stock.

The transverse opening 34, as indicated in FIG. 2, is offset relative to the lathe center 22 and accommodates the tool 20 which is likewise offset. It will be understood that the opening 34 is oversize and sufficiently large to permit lateral adjustment of the tool 20 relative to said lathe center 22.

It is thought that the functional and structural advantages of this adaptor have become fully apparent from the foregoing description of parts but for completeness of disclosure the installation and usage of the device will be briefly summarized.

The tool holder 11 is mounted to the tailstock 12 in the conventional manner. Prior to mounting the adaptor 10 to the tool holder 11 the requisite bushing 40, having an aperture 42 matching the size of the stock to be pointed or otherwise machined, is inserted within the forward portion 36 of the axial opening 33. The stem 32 of the adaptor 10 is then slidably inserted within the bored hole 27 of the tool holder 11, and the set screw 30 tightened to secure said adaptor 10 in coaxial alignment with the tool holder 11 and the lathe center 22. It will be understood that the oversize transverse opening 34 is substantially aligned with the gap 17 in the tool holder body 11 so that the tool 20 can be mounted and adjusted to correct position by means of set screws 21. When this has been accomplished the rod stock 35, mounted in the chuck [not shown] may be advanced relative to the adaptor 10 and slidably inserted through the bushing aperture 42 into proximity with the tool 20. The machining operation may now be commenced in the usual manner.

I claim as my invention:

1. A lathe attachable tool holder assembly for supporting bar stock during machining, the assembly comprising:
   a. a tool holder, including:
      1. a body having an axis aligned with the lathe center,
      2. means adapted to attach the tool holder body to the lathe,
      3. a tool including an outer end attached to the tool holder body and an inner cutting end adapted to machine the bar stock, and
   b. a separable adaptor removably attached to the tool holder to provide journal support for the remote end of relatively slender bar stock, including:
      1. a body having an axis aligned with the lathe center and including a forward portion, having an oversize transverse opening receiving the tool in clearance relation, and a rearward portion,
      2. support means carried by the adaptor body and including an axial aperture having a support margin disposed forwardly of the tool and adapted to support bar stock during machining by the tool,
      3. means removably attaching the rearward portion of the adaptor body to the tool holder to permit independent use of the tool holder.
2. An assembly as defined in claim 1, in which:
   c. the tool holder body includes a bored hole aligned with the lathe center, and
   d. the rearward portion of the adaptor body attaching the adaptor body to the tool holder body includes a reduced diameter axial stem receivable by the bored hole and the forward portion of the adaptor body adjacent said stem is unsupported by said tool holder body.
3. An assembly as defined in claim 2, in which:
   e. the oversize transverse opening of the adaptor is offset from the lathe center to facilitate lateral adjustment of the tool.
4. A lathe attachable tool holder assembly for supporting bar stock during machining, the assembly comprising:
   a. a tool holder, including:
      1. a substantially ell-shaped body providing a radially outstanding portion having a bored hole axially aligned with the lathe center and a forwardly extending offset portion,
      2. means adapted to attach the tool holder body to the lathe,
      3. a tool including an outer end attached to the offset portion of the tool holder body in cantilever relation and an inner cutting end adapted to machine the bar stock, and
   b. a separable adaptor removably attached to the tool holder to provide journal support for the remote end of relatively slender bar stock, including:
      1. a body having an axial opening aligned with the lathe center and including a forward portion, underlying the tool holder body offset portion in spaced relation and having an oversize transverse opening extending therethrough and receiving the tool in clearance relation, and a rearward portion,
      2. a selectively apertured bushing received by said axial opening and carried by the adaptor body and adapted to support bar stock during machining by the tool,
      3. stem means received by the bored hole of the tool holder body for removably attaching the rearward portion of the adaptor body to the tool holder to permit independent use of the tool holder.

* * * * *